F. H. LEINWEBER, DEC'D.
C. H., W. H & V. H. LEINWEBER, EXECUTORS,
LANDING GEAR FOR AIRSHIPS.
APPLICATION FILED MAY 5, 1917.
1,288,937.
Patented Dec. 24, 1918.
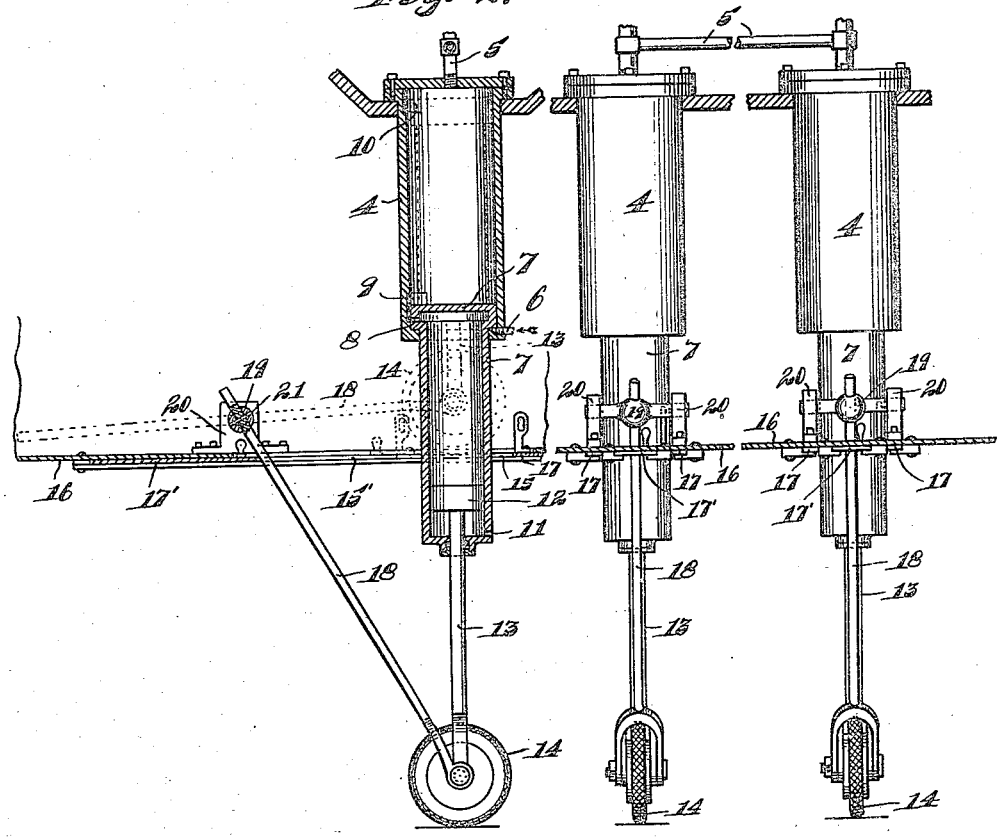

UNITED STATES PATENT OFFICE.

FREDERICK H. LEINWEBER, OF CHICAGO, ILLINOIS; CURTIS H. LEINWEBER, WILLIAM H. LEINWEBER, AND VICTOR H. LEINWEBER EXECUTORS OF SAID FREDERICK H. LEINWEBER, DECEASED.

LANDING-GEAR FOR AIRSHIPS.

1,288,937.  Specification of Letters Patent.  Patented Dec. 24, 1918.

Application filed May 5, 1917. Serial No. 166,616.

*To all whom it may concern:*

Be it known that I, FREDERICK H. LEINWEBER, a citizen of the United States, and a resident of the city of Chicago, county of Cook, and State of Illinois, have invented certain new and useful Improvements in Landing-Gears for Airships, of which the following is a specification.

My invention relates to improvements in landing gears for airships and has for its object the provision of an improved mounting for the traction wheels thereof which permits of the ready retraction of said wheels when desired.

The invention consists in the combinations and arrangements of parts hereinafter described and claimed.

The invention will be best understood by reference to the accompanying drawing forming a part of this specification, and in which, Figure 1 is a partial horizontal section illustrating the mounting of one of the traction wheels of the airship, Fig. 2, a vertical section of the same, and Fig. 3, a section taken at right angles to Fig. 2.

The airship body is equipped with a plurality of downwardly extending air cylinders 4 having a pipe system 5 connected with their upper ends for supplying compressed air thereto or exhausting said cylinders, the opposite cylinders 4 being interconnected as indicated. The cylinders 4 are also connected with a pipe system 6 by means of which the lower ends thereof may be supplied with compressed air or exhausted when desired.

Each of the cylinders 4 is equipped with a hollow piston cylinder 7 operating therein and provided at its upper end with a port 8 coöperating with by-pass ports 9 and 10 in the lower and upper ends respectively of the walls of the corresponding cylinder. Each of the piston cylinders 7 is provided with a port 11 at its lower end adapted to place the same in communication with the lower portion of the corresponding cylinder 4 when the piston cylinder is retracted. Each of the piston cylinders 7 is provided with a piston 12 carrying a piston rod 13 on the lower end of which is arranged a traction wheel 14, suitable openings 15 being provided in the bottom 16 of the airship to permit of the extension or retraction of said wheels. Each of the openings 15 is provided with an extension 15' and slides or closures 17 and 17' are provided for closing said openings. A brace 18 is pivotally connected with the lower end of each of the piston rods 13 and is arranged to slide through a shaft or trunnion 19 mounted in brackets 20 on the inside of the ship, the corresponding opening extension 15' accommodating the corresponding brace. Each of the braces 18 and the corresponding trunnion 19 are provided with registering openings adapted to receive lock pins 21, whereby said braces may be locked in operative position.

In use, when it is desired to extend the traction wheels 14 for landing or otherwise, the openings 15—15' are opened, compressed air supplied to the pipe system 5 and the pipe system 6 exhausted. The compressed air entering the cylinder 4 passes partly to the piston cylinder 7 through passage 10, thus extending the traction wheels 14 through the openings 15. This also extends the braces 18 which are locked in position by pins 21 preparing the ship for alighting on land or the like. When it is desired to retract the traction wheels, during flight, or preparatory to landing upon water, pins 21 are withdrawn, pipe system 5 is exhausted and compressed air supplied to the pipe system 6. This retracts the wheels 14, whereupon the closures 17—17' are closed thus sealing the ship against the entry of water.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with an airship body, of a plurality of compressed fluid cylinders in said body and extending downwardly with relation thereto; a piston cylinder operating in each of said cylinders; a piston operating in each of said piston cylinders;

a piston rod for each of said pistons; a traction wheel on each of said piston rods; and means for supplying said cylinder and piston cylinder with fluid under pressure and exhausting the same, substantially as described.

2. The combination with an airship body, of a plurality of compressed fluid cylinders in said body and extending downwardly with relation thereto; a piston cylinder operating in each of said cylinders; a piston operating in each of said piston cylinders; a piston rod for each of said pistons; a traction wheel on each of said piston rods; means for supplying said cylinder and piston cylinder with fluid under pressure and exhausting the same; a brace for each of said piston rods, there being an opening in the bottom of the airship permitting the passage of the corresponding brace and traction wheel; and a closure for each of said openings, substantially as described.

In testimony whereof I have signed my name to this specification in the presence of two subscribing witnesses.

FREDERICK H. LEINWEBER.

Witnesses:
  JOSHUA R. H. POTTS,
  HELEN F. LILLIS.